US012540357B2

(12) United States Patent
Hare

(10) Patent No.: US 12,540,357 B2
(45) Date of Patent: *Feb. 3, 2026

(54) METHOD OF DETERMINING RESPONSIVENESS TO CELL THERAPY IN DILATED CARDIOMYOPATHY

(71) Applicant: UNIVERSITY OF MIAMI, Miami, FL (US)

(72) Inventor: Joshua M. Hare, Miami Beach, FL (US)

(73) Assignee: UNIVERSITY OF MIAMI, Miami, FL (US)

( * ) Notice: Subject to any disclaimer, the term of this patent is extended or adjusted under 35 U.S.C. 154(b) by 1207 days.

This patent is subject to a terminal disclaimer.

(21) Appl. No.: 17/291,556

(22) PCT Filed: Nov. 8, 2019

(86) PCT No.: PCT/US2019/060562
§ 371 (c)(1),
(2) Date: May 5, 2021

(87) PCT Pub. No.: WO2020/097525
PCT Pub. Date: May 14, 2020

(65) Prior Publication Data
US 2022/0002804 A1 Jan. 6, 2022

Related U.S. Application Data

(60) Provisional application No. 62/758,467, filed on Nov. 9, 2018, provisional application No. 62/757,745, filed on Nov. 8, 2018.

(51) Int. Cl.
C12Q 1/6883 (2018.01)
A61K 35/28 (2015.01)

(52) U.S. Cl.
CPC ............ *C12Q 1/6883* (2013.01); *A61K 35/28* (2013.01); *C12Q 2600/106* (2013.01); *C12Q 2600/156* (2013.01)

(58) Field of Classification Search
CPC ............ C12Q 1/6883; C12Q 2600/106; C12Q 2600/156; A61K 35/28
See application file for complete search history.

(56) References Cited

U.S. PATENT DOCUMENTS 6,159,693 A 12/2000 Shultz et al.
2006/0276685 A1* 12/2006 Dinsmore ................. A61P 9/10
600/37

FOREIGN PATENT DOCUMENTS

GB 2514424 A 11/2014
WO 2015/117010 A2 8/2015
WO 2017/095487 A1 6/2017
WO 2018/002215 A1 1/2018
WO WO-2018/089752 A1 5/2018

OTHER PUBLICATIONS

Pugh et al. (Genet Med. Aug. 2014; 16(8):601-8. doi: 10.1038/gim.2013.204. Epub Feb. 6, 2014.; referenced in IDS filed Aug. 1, 2023) (Year: 2014).*
Hershberger et al. (Genet Med. Sep. 2018;20(9):899-909. doi: 10.1038/s41436-018-0039-z. Epub Jun. 14, 2018.referenced in IDS filed Jan. 19, 2024). (Year: 2018).*
Supplementary European search report, EP App. No. 19881820, Jul. 13, 2022, 10 pages.
Telukuntla et al., The advancing field of cell-based therapy: insights and lessons from clinical trials, Journal of the American Heart Association, 2(5):e000338 (2013).
Tsai et al., Plasma vascular endothelial growth factor as a marker for early vascular damage in hypertension, Clinical Science, 109(1):39-43 (2005).
Vasa et al., Number and migratory activity of circulating endothelial progenitor cells inversely correlate with risk factors for coronary artery disease, Circulation Research, 89(1):e1-e7 (2001).
Wei et al., Changes and function of circulating endothelial progenitor cells in patients with cerebral aneurysm, Journal of neuroscience research, 89(11):1822-8 (2011).
Werner et al., Circulating endothelial progenitor cells and cardiovascular outcomes, N. Engl. J. Med., 353(10):999-1007 (2005).
Werner et al., Endothelial progenitor cells correlate with endothelial function in patients with coronary artery disease, Basic research in cardiology, 102(6):565-71 (2007).
Williams et al., Mesenchymal stem cells: biology, pathophysiology, translational findings, and therapeutic implications for cardiac disease, Circulation research, 109(8):923-40 (2011).
Yu et al., Aging-related genes in mesenchymal stem cells: a mini-review, Gerontology, 59(6):557-63 (2013).
Zampetaki et al., Vascular repair by endothelial progenitor cells, Cardiovascular Research, 78(3):413-21 (2008).
Pajic et al., The Serum Level of Mir-30a-3p And Mir-31-5p Can Discriminate Responders From Non-responders to CD34+ Cell Therapy in Patients With Dilated Cardiomyopathy, Circulation, 132(Suppl. 3): 18925, (2015).
Jokerst et al., Circulating Biomarkers to Identify Responders in Cardiac Cell therapy, Sci. Rep., 7: 4419, (2017).
Hershberger et al., Genetic Evaluation of Cardiomyopathy-A Heart Failure Society of America Practice Guideline, J. Card. Fail., 24(5): 281-302, (2018).
Alber et al., Atorvastatin decreases vascular endothelial growth factor in patients with coronary artery disease, Journal of the American College of Cardiology, 39(12):1951-1955 (2002).
Araya et al., Deep mutational scanning: assessing protein function on a massive scale, Trends Biotechnology, 29(9):435-442 (2011).
Blum, Heart failure—new insights, IMAJ, 12:105-11 (2009).
Bustos et al., Aging mesenchymal stem cells fail to protect because of impaired migration and antiinflammatory response, American Journal of Respiratory and Critical Care Medicine, 189(7):787-98 (2014).

(Continued)

*Primary Examiner* — Fereydoun G Sajjadi
*Assistant Examiner* — Joel D Levin
(74) *Attorney, Agent, or Firm* — MARSHALL, GERSTEIN & BORUN LLP

(57) ABSTRACT

The present disclosure is directed to methods for determining responsiveness to cell therapy in a subject suffering from a cardiovascular disorder (e.g., cardiomyopathy) and methods of treating subjects suffering from a cardiovascular disorder.

17 Claims, 5 Drawing Sheets

(56) References Cited

OTHER PUBLICATIONS

Caplan et al., Mesenchymal stem cells as trophic mediators, Journal of Cellular Biochemistry, 98(5):1076-84 (2006).
Chang et al., Age decreases endothelial progenitor cell recruitment through decreases in hypoxia-inducible factor 1alpha stabilization during ischemia, Circulation, 116(24):2818-29 (2007).
Chen et al., Paracrine factors of mesenchymal stem cells recruit macrophages and endothelial lineage cells and enhance wound healing, PloS one, 3(4):e1886 (2008).
Chin et al., Vascular endothelial growth factor and soluble P-selectin in acute and chronic congestive heart failure, The American Journal of Cardiology, 90(11):1258-60 (2002).
Corretti et al., Guidelines for the ultrasound assessment of endothelial-dependent flow-mediated vasodilation of the brachial artery: a report of the International Brachial Artery Reactivity Task Force, Journal of the American College of Cardiology, 39(2):257-65 (2002).
Eleuteri et al., Stepwise increase of angiopoietin-2 serum levels is related to haemodynamic and functional impairment in stable chronic heart failure, European Journal of Cardiovascular Prevention & Rehabilitation, 18(4):607-14 (2011).
Gnecchi et al., Paracrine mechanisms in adult stem cell signaling and therapy, Circulation Research, 103(11):1204-19 (2008).
Go et al., Heart disease and stroke statistics—2014 update: a report from the American Heart Association, Circulation, 129(3):e28-e292 (2014).
Groenning et al., Antiremodeling effects on the left ventricle during beta-blockade with metoprolol in the treatment of chronic heart failure, J. American College of Cardiology, 36(7):2072-2080 (2000).
Hare et al., A randomized, double-blind, placebo-controlled, dose-escalation study of intravenous adult human mesenchymal stem cells (prochymal) after acute myocardial infarction, J. Am. Coll. Cardiol., 54(24):2277-86 (2009).
Hare et al., Comparison of allogeneic vs autologous bone marrow-derived mesenchymal stem cells delivered by transendocardial injection in patients with ischemic cardiomyopathy: the POSEIDON randomized trial, JAMA, 308(22):2369-79 (2012).
Hasselberg et al., Lamin A/C cardiomyopathy: young onset, high penetrance, and frequent need for heart transplantation, Eur. Heart J., 39(10):853-860 (2018).
Hatzistergos et al., Bone marrow mesenchymal stem cells stimulate cardiac stem cell proliferation and differentiation, Circulation research, 107(7):913-22 (2010).
Hershberger et al., Genetic evaluation of cardiomyopathy: a clinical practice resource of the American College of Medical Genetics and Genomics (ACMG), Genetics in Medicine, 20(9): 899-909 (2018).
Hill et al., Circulating endothelial progenitor cells, vascular function, and cardiovascular risk, New England Journal of Medicine, 348(7):593-600 (2003).
International Application No. PCT/US19/60562, International Preliminary Report on Patentability, mailed May 20, 2021.
International Application No. PCT/US19/60562, International Search Report and Written Opinion, mailed Mar. 20, 2020.
Kalogeropoulos et al., Characteristics and Outcomes of Adult Outpatients With Heart Failure and Improved or Recovered Ejection Fraction, JAMA Cardiology, 1(5):510-518 (2016).
Karantalis et al., Cell-based therapy for prevention and reversal of myocardial remodeling, Am. J. Physiol. Heart Circ. Physiol., 303(3):H256-70 (2012).
Kayvanpour et al., Genotype-phenotype associations in dilated cardiomyopathy: meta-analysis on more than 8000 individuals, Clinical research in cardiology, 106(2):127-39 (2017).
Lee et al., Therapeutic Potential of Stem Cells Strategy for Cardiovascular Diseases, Stem Cells International, Article ID 4285938 (2016).
Lenarda et al., Changing mortality in dilated cardiomyopathy. The Heart Muscle Disease Study Group, Brit. Heart J., 72:S46-S51 (1994).
Li et al., The sequence and de novo assembly of the giant panda genome, Nature, 463:311-317 (2010).
Lo et al., Next-Generation Sequencing of Plasma/Serum DNA: An Emerging Research and Molecular Diagnostic Tool, Clin. Chem., 55(4):607-608 (2009).
Marti et al., Endothelial dysfunction, arterial stiffness, and heart failure, Journal of the American College of Cardiology, 60(16):1455-69 (2012).
Mcellistrem, Genetic diversity of the pneumococcal capsule: implications for molecular-based serotyping, Future Microbiol., 4(7):857-865 (2009).
Merlo et al., Poor prognosis of rare sarcomeric gene variants in patients with dilated cardiomyopathy, Clin. and Translational Science, 6(6):424-428 (2013).
Merlo et al., Prevalence and prognostic significance of left ventricular reverse remodeling in dilated cardiomyopathy receiving tailored medical treatment, J. Amer. College of Cardiol., 57(13):1468-1476 (2011).
Miller et al., Getting to know our guests: characterizing the reproductive microbiome by next generation sequencing. Preface, Syst. Biol. Reprod. Med., (57(3):117-118 (2011).
Pelak et al., The characterization of twenty sequenced human genomes, PLoS Genet., 6(9):e1001111 (2010).
Polovina et al., Endothelial dysfunction in metabolic and vascular disorders, Postgraduate medicine, 126(2):38-53 (2014).
Premer et al., Allogeneic Mesenchymal Stem Cells Restore Endothelial Function in Heart Failure by Stimulating Endothelial Progenitor Cells, EBioMedicine, 2(5):467-475 (2014).
Pugh et al., The landscape of genetic variation in dilated cardiomyopathy as surveyed by clinical DNA sequencing, Genetics in Medicine, 16(8)601-608 (2014).
Rasmussen et al., Ancient human genome sequence of an extinct Palaeo-Eskimo, Nature, 463:757-762 (2010).
Rehman et al., Peripheral blood "endothelial progenitor cells" are derived from monocyte/macrophages and secrete angiogenic growth factors, Circulation, 107(8):1164-9 (2003).
Rijsingen et al., Gender-specific differences in major cardiac events and mortality in lamin A/C mutation carriers, Eur. J. Heart Failures, 15(4):376-384 (2013).
Rikhtegar et al., Stem cells as therapy for heart disease: iPSCs, ESCs, CSCs, and skeletal myoblasts, Biomedicine & Pharmacotherapy, 109:304-313 (2019).
Robinson, Whole-exome sequencing for finding de novo mutations in sporadic mental retardation, Genome Biol., 11(12):144 (2010).
Roura et al., Vascular dysfunction in idiopathic dilated cardiomyopathy, Nature Reviews Cardiology, 6(9):590-8 (2009).
Schmidt-Lucke et al., Reduced number of circulating endothelial progenitor cells predicts future cardiovascular events: proof of concept for the clinical importance of endogenous vascular repair, Circulation, 111(22):2981-7 (2005).
Schulman et al., Interaction between nitric oxide and angiotensin II in the endothelium: role in atherosclerosis and hypertension, Journal of hypertension Supplement, 24(1):S45-50 (2006).
Schulman et al., Key developments in stem cell therapy in cardiology, Regen. Med., 7:17-24 (2012).
Seko et al., Serum levels of endostatin, vascular endothelial growth factor (VEGF) and hepatocyte growth factor (HGF) in patients with acute myocardial infarction undergoing early reperfusion therapy, Clinical Science, 106(5):439-42 (2004).
Shantsila et al., Endothelial progenitor cells in cardiovascular disorders, J. Am. Coll. Cardiol., 49(7):741-52 (2007).
Srivatsan et al., High-precision, whole-genome sequencing of laboratory strains facilitates genetic studies, PLoS Genet., 4(8):e100139 (2008).
Suncion et al., Concise review: the role of clinical trials in deciphering mechanisms of action of cardiac cell-based therapy, Stem Cells Translational Medicine, 1(1):29-35 (2012).

\* cited by examiner

METHOD OF DETERMINING RESPONSIVENESS TO CELL THERAPY IN DILATED CARDIOMYOPATHY

CROSS REFERENCE TO RELATED APPLICATIONS

This application claims the benefit of U.S. Provisional Patent Application Nos. 62/757,748, filed on Nov. 8, 2018, and 62/758,467, filed on Nov. 9, 2018, the entire contents of which are fully incorporated herein by reference.

STATEMENT OF U.S. GOVERNMENT INTEREST

This invention was made with U.S. government support under grant number HL110737 awarded by the National Institutes of Health. The U.S. government has certain rights in the invention.

FIELD OF THE INVENTION

The present disclosure is directed to materials and methods identifying subjects that benefit from cell therapy and methods for treating such subjects.

BACKGROUND

Improvement of left ventricle function (LV) and/or restoration of LV geometry, referred to as reverse remodeling, is associated with improved quality of life (4), and with reductions in mortality (5), LVAD implantation, heart transplants and hospitalization. (6) The therapeutic response of heart failure with reduced ejection fraction (HFrecEF) is a recognized outcome with improved prognosis compared to HF with a persistently reduced ejection fractions (EF). (7) Thus recovery of LV function in patients with cardiomyopathy is a meaningful goal of therapy in heart failure with reduced ejection fraction (HFrEF).

Prognosis in patients with dilated cardiomyopathy (DCM) has improved during the last decade, due to the earlier diagnosis and introduction of effective neurohormonal treatments (Groenning et al., J. American College of Cardiology, 36:2072-2080, 2000; DiLenarda et al., Brit. Heart J., 72:S46-S51, 1994) and device therapy. However, DCM is still the leading condition leading to heart transplant (Merlo et al., J. Amer. College of Cardiol., 57:1468-1476, 2011). MACE events occur early after diagnosis and remain unpredictable.

SUMMARY

In one aspect, described herein is a method of treating a cardiovascular disorder in a subject in need thereof comprising administering to a subject identified as a hyper-responder to cell therapy an amount of cells to treat the cardiovascular disorder in the subject. In some embodiments, the subject is suffering from a cardiovascular disorder such as, for example, heart failure, adriamycin-induced cardiomyopathy, idiopathic dilated cardiomyopathy, ischemic cardiomyopathy, myocarditis, ischemic heart disease, cardiomyopathy due to infiltrative myocardial disease, cardiomyopathy due to amyloidosis, cardiomyopathy due to sarcoidosis, cardiomyopathy due to hemochromatosis, peripartum cardiomyopathy, cardiomyopathy due to hypertension, cardiomyopathy due to infection with the human immunodeficiency virus, cardiomyopathy due to connective-tissue disease, cardiomyopathy due to scleroderma, cardiomyopathy due to systemic lupus erythematosus, cardiomyopathy due to Marfan's syndrome, cardiomyopathy due to polyarteritis nodosum, cardiomyopathy due to nonspecific connective-tissue disease, cardiomyopathy due to ankylosing spondylitis, cardiomyopathy due to rheumatoid arthritis, cardiomyopathy due to relapsing polychondritis, cardiomyopathy due to Wegener's granulomatosis, cardiomyopathy due to mixed connective-tissue disease, cardiomyopathy due to substance abuse, cardiomyopathy due to chronic alcohol abuse, cardiomyopathy due to cocaine abuse, cardiomyopathy due to doxorubicin therapy, restrictive cardiomyopathy, familial cardiomyopathy, cardiomyopathy due to valvular heart disease, cardiomyopathy due to endocrine dysfunction, cardiomyopathy due to thyroid disease, cardiomyopathy due to carcinoid, cardiomyopathy due to pheochromocytoma, cardiomyopathy due to acromegaly, cardiomyopathy due to neuromuscular disease, cardiomyopathy due to neoplastic heart disease, cardiomyopathy due to congenital heart disease, cardiomyopathy due to complication of coronary-artery bypass surgery, cardiomyopathy due to radiation, cardiomyopathy due to critical illness, cardiomyopathy due to endomyocardial fibroelastosis, cardiomyopathy due to thrombotic thrombocytopenic purpura, cardiomyopathy due to rheumatic carditis, cardiomyopathy due to leukotriene therapy, cardiomyopathy due to lithium therapy or cardiomyopathy due to prednisone therapy. In various embodiments, the method improves vascular tone.

In some embodiments, the cells are mesenchymal stem cells, induced pluripotent stem cells, embryonic stem cells and/or cardiac stem cells. In some embodiments, the cells are mesenchymal stem cells (MSCs). In some embodiments, the cells (e.g., MSCs) are allogeneic cells (e.g., allogeneic MSCs). In some embodiments, the cells (e.g., MSCs) are autologous cells (e.g., autologous MSCs). In some embodiments, the cells (e.g., MSCs) are obtained from bone marrow, cord blood, adipose tissue, Wharton's Jelly or amniotic fluid.

In some embodiments, the method comprises determining the presence or absence of one or more pathologic variants in a gene associated with a cardiovascular disorder in a sample of the subject, wherein the absence of the pathologic genetic variant(s) identifies the subject as a hyper-responder to cell therapy. In some embodiments, the subject is screened for one or more pathologic genetic variants set forth in FIG. 1 (i.e., it is determined whether the subject comprises a mutation in one or more of the genes of FIG. 1). In some embodiments, the subject is screened for one or more pathologic genetic variants in one or more of the following genes: ACTC, NYH7, MYH6, MYBPC3, TNNT2, TNNC1, TNNI3, TPM1, TTN, DMD, DES, LDB3, SGCD, PDLIM3, VCL, RYAB, ILK, LAMA4, FLNC, TCAP, CSRP3, ACTN2, MYPN, ANKRD1, BAG3, LMNA, TMPO, PSEN1, PSEN2, PLN, EYA4, TAZ/G4.5, CPT2, ACADVL, RBM20, ABCC, SCN5A, GATAD1, PRDM16, GAA, FKRP, CTNNA3, DSP, PKP2, SOS2, and ALMS1 (i.e., any combination of the referenced genes are contemplated). Thus, in some embodiments, the subject (e.g., a subject presenting with a cardiovascular disorder), lacks a pathologic genetic mutation in one or more of the genes set forth in FIG. 1 (e.g., ACTC, NYH7, MYH6, MYBPC3, TNNT2, TNNC1, TNNI3, TPM1, TTN, DMD, DES, LDB3, SGCD, PDLIM3, VCL, RYAB, ILK, LAMA4, FLNC, TCAP, CSRP3, ACTN2, MYPN, ANKRD1, BAG3, LMNA, TMPO, PSEN1, PSEN2, PLN, EYA4, TAZ/G4.5, CPT2, ACADVL, RBM20, ABCC, SCN5A, GATAD1, PRDM16, GAA, FKRP, CTNNA3, DSP, PKP2, SOS2, and/or ALMS1). In some embodiments, the subject lacks a pathologic mutation in one or more of the following genes: ANKRD, BAG3, DMD, GATAD1, LDB3, LMNA, MYBPC3, MYH6, RBM20, TNNT2, TTN and RBM20. Optionally, the subject lacks a pathologic mutation in all of ANKRD, BAG3, DMD, GATAD1, LDB3, LMNA, MYBPC3, MYH6, RBM20, TNNT2, TTN and RBM20.

The cells (e.g., mesenchymal stem cells, induced pluripotent stem cells, embryonic stem cells or cardiac stem cells) are administered according to any suitable method, including those known in the art. In some embodiments, the cells are administered locally. In some embodiments, the cells (e.g., mesenchymal stem cells, induced pluripotent stem cells, embryonic stem cells or cardiac stem cells) are administered by transendocardial injection.

The cells (e.g., mesenchymal stem cells, induced pluripotent stem cells, embryonic stem cells or cardiac stem cells) are optionally administered in an amount ranging from about 20 million to about 10 billion cells. In some embodiments, the cells (e.g., mesenchymal stem cells, induced pluripotent stem cells, embryonic stem cells or cardiac stem cells) are administered in an amount ranging from about 20 million to about 30 million cells, or about 20 millions to about 40 million cells, or about 20 million to about 50 million cells, or about 20 million to about 60 million cells, or about 20 million to about 70 million cells, or about 20 million to about 80 million cells, or about 20 million to about 90 million cells, or about 30 million to about 50 million cells, or about 30 million to about 70 million, or about 30 million to about 90 million cells, or about 50 million to about 100 million cells, or about 100 million to about 300 million cells, or about 200 million to about 400 million cells, or about 500 million to about 1 billion cells, or about 500 million to about 10 billion cells. In some embodiments, about 20 million, or about 25 million, or about 30 million, or about 35 million, or about 40 million, or about 45 million, or about 50 million, or about 55 million, or about 50 million, or about 55 million, or about 60 million, or about 65 million, or about 70 million, or about 75 million, or about 80 million, or about 85 million, or about 90 million, or about 95 million, or about 100 million, or about 200 million, or about 300 million, or about 400 million, or about 500 million, or about 600 million, or about 700 million, or about 800 million, or about 900 million, or about 1 billion, or about 2 billion, or about 3 billion, or about 4 billion, or about 5 billion, or about 6 billion, or about 7 billion, or about 8 billion, or about 9 billion, or about 10 billion cells are administered to the subject.

In some embodiments, administration of the cells (e.g., mesenchymal stem cells, induced pluripotent stem cells, embryonic stem cells or cardiac stem cells) to the subject results in an increase in flow-mediated vasodilation (FMD) in the subject of at least 3%.

In any of the methods described herein, the subject is a human subject.

BRIEF DESCRIPTION OF THE FIGURES

FIG. 2A is a graph showing that V− patients had the greatest increase in ejection fraction (EF) at 12 months compared with VUS: and a decrease in PV+ patients. FIG. 2B is a graph showing that the six minute walk distance was increased in the V− patients vs. VUS: and PV+. FIG. 2C is a graph showing that V− patients improved in a greater extent in Minnesota Living with Heart Failure Questionnaire (MLHFQ): contrasted with VUS and PV+. FIG. 2D is a graph showing the percentage change in New York Heart Association (NYHA) shown significant difference between groups. V− Improved by 60% in contrast to VUS: 53% and 25% in PV+. FIG. 2E is a graph showing that endothelial progenitor colonies (EPC) significantly increased over time only in V− group. V−=negative for any pathologic variants group (bar on the far left), VUS=variants of uncertain significance group (middle bar) PV+=positive for pathologic/likely pathologic variant group (bar on the far right). *p=<0•05, p=0•01*p=0•001****p<0•0001.

FIG. 3A: PV− patients had 100% of survival, VUS had 85% and PV+ had 40% of survival, Log-rank (Mantel-Cox) test p=0•015. Overall, PV+ patient's had a substantial increase of death, transplant or LVAD risk by 1 year follow-up. FIG. 3B: MACE events differ between V− patients 0 events, VUS had 7 events and PV+ had 6 events in 4 patients (Log-rank (Mantel-Cox) test=0•021). V−=negative for any pathologic variants group (bottom line on the graph, overlaps with x-axis), VUS=variants of uncertain significance group (middle line on the graph) PV+=positive for pathologic/likely pathologic variant group (top line on the graph).

DETAILED DESCRIPTION

Figure 1:
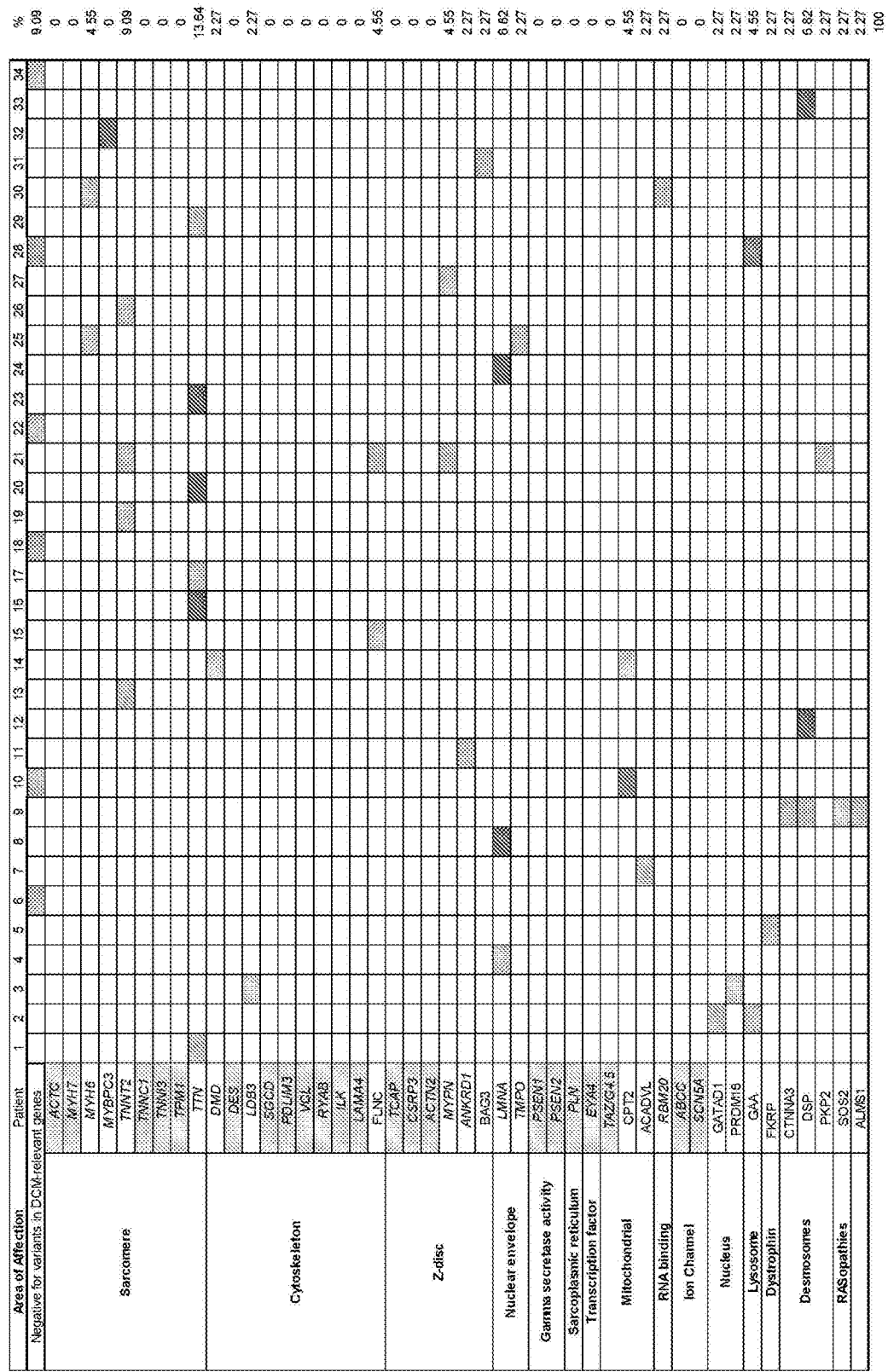
FIG. 1 is a table providing the genetic profiles of individual patients. Colored cells represent PV− ((patients 6, 10, 18, 22, 28 and 34), VUS (patient 1 (TTN), patient 2 (GATAD1, GAA), patient 3 (LDB3), patient 4 (LMNA, PRDM16), patient 5 (FKRP), patient 7 (ACADVL), patient 9 (CTNNA3, DSP, SOS2, ALMS1), patient 11 (ANKRD1), patient 13 (TNNT2), patient 14 (DMD, CPT2), patient 15 (FLNC), patient 17 (TTN), patient 19 (TNNT2), patient 21 (TNNT2, FLNC, MYPN, PKP2), patient 25 (MYH6, PSEN1), patient 26 (TNNT2), patient 27 (MYPN), patient 29 (TTN), patient 30 (MYH6, RBM20), and patient 31 (BAG3)), or PV+ (patient 8 (LMNA), patient 12 (DSP), patient 16 (TTN), patient 20 (TTN), patient 23 (TTN), patient 24 LMNA), patient 32 (MYNPC3) and patient 33 (DSP)), Variants not relevant for cardiomyopathy (patient 10 (CPT2) and patient 28 (GAA)). Patient 10 and 28 have duplicated box because they are negative for PV's potentially related to DCM, but reported as present in the genes for completeness of genetic data.

The present disclosure is based, at least in part, on the discovery that non-ischemic dilated cardiomyopathy (NIDCM) patients with an apparent genetic basis for NIDCM responded differently to mesenchymal stem cell (MSC) therapy than did those without associated pathologic genetic variants. Among patients with NIDCM, a substantial proportion have familial clustering and identifiable genetic variants (Kayvanpour et al., Clinical research in cardiology: official journal of the German Cardiac Society. 2017; 106 (2):127-39) including mutations in cytoskeletal, nuclear membrane, sarcomere, mitochondria, desmosome and RNA binding proteins. Several secondary modifiers, such as environmental factors, comorbidities, or other factors that modulate the phenotype and outcome, can alter these primary pathologic variants. As described in the Examples, the identified NIDCM genotype plays a major role in determining individual patient responsiveness to mesenchymal stem cell therapy (e.g., intramyocardial MSC delivery). The disclosure provides a method to identify patients that are hyper-responsive to cell (e.g., MSC) therapy via genetic testing and, surprisingly, individuals that lack genetic determinants associated with cardiovascular disease respond better to cell (e.g., MSC) therapy.

A determination of whether a patient is a "hyper-responsive" to cell (e.g., MSC) therapy involves an assessment of the probability of the extent to which a subject will respond to therapy. By "hyper-responder" is meant that a patient demonstrates a more profound response to cell (e.g., MSC) treatment that others. In some embodiments, a patient that is hyper-responsive to the cell (e.g., MSC) therapy will show one or more of improved cardiac function and functional capacity, increased ejection fraction, and/or increase in the six-minute walk distance, compared to patients having the pathologic gene variants that were also treated with the cell (e.g., MSC) therapy.

As described herein, patients presenting with a cardiovascular disorder but who lacked pathologic gene variants associated with the cardiovascular disorder (e.g., NIDCM, pathologic genetic variants associated with which are provided in FIG. 5) had a greater improvement in ejection fraction (EF), with 55% of the V− patients transitioning to heart failure with recover ejection fraction (HFrecEF). MSC therapy has robust immunomodulatory, effect evidence by the significant decrease TNF-α in all groups, and improved restoration of endothelial function (Premer et al., E Bio Medicine, 2:467-475, 2014) which could play a primordial mechanism in patients with negative mutations. This is supported by the fact that the greatest increase in endothelial progenitor colonies (EPC) was in the V− patients, while conversely raising the possibility that genetically-based DCM may be resistant to these responses on an inherent cellular basis.

The genetic data provided in Example 1 demonstrates that variants of uncertain significance (VUS) and positive for pathologic/likely pathologic variant (PV+) patients had mild-to-absent responses and maintain as heart failure with reduced ejection fraction (HFrEF), expressed by a higher mortality, LVAD requirements, transplant and MACE events compared to heart failure with recover ejection fraction (HFrecEF, Kalogeropoulos et al., JAMA Cardiology, 1:510-518, 2016). Independent factors associated with blunted responses include long heart failure (HF) duration, greater end-diastolic volume (EDV), New York Heart Failure Association (NYHA) classes III-IV, and lower systolic blood pressure (Merlo et al., Clin. and Translational Science, 6:424-428, 2013)

Several single center studies and meta-analyses have evaluated the relationship of phenotype at presentation and outcomes associated with variants in specific genes. Most showed clinical presentations in the fourth and fifth decades of life with prevalence in males. The more common associations include variants in LMNA, RBM20 and sarcomeric gene mutations including TTN, MYH6, MYBPC3 and TNNT(24), similar to those described previously in our population. Interestingly, patients with LMNA, PLN and RBM20 mutations were associated with a higher transplant rate and poor outcome, similar to our transplanted population. Tobita et al. evaluated left ventricular function and the presence or absence of reverse remodeling associated with genetic variants in patients with DCM. TTN truncating variants were the most common (15) and were associated with lower baseline ejection fraction (EF). While patient with TTN truncating variants in our study (N=6) also exhibit lower baseline ejection fraction, in contrast to Tobita's data, the subjects described in the Examples who carried these variants did not improve left ventricle function over time. Nevertheless, better prognosis evinced by lower transplant and death rate was observed in patients with TTN truncating variant after treatment compared to patients with LMNA truncating variant (Tobita, supra). Similar to previous studies, patients harboring LMNA PV+ truncating variant had a worse outcome and higher (100%) heart transplantation. (van Rijsingen et al., Eur. J. Heart Failures, 15:376-384, 2013; Hasselberg et al., Eur. Heart J., 39:853-860, 2018). Another factor evaluated in the responsiveness to cell delivery was the contribution of multiple positive pathological variants into worse outcome. The data provided in Example 2 did not show evidence that multiple VUSs were associated with a worse prognosis. Hereditary defects in cardiac structural proteins might influence the response of cell delivery compared to favorable genetic background.

As described herein, patients that are negative for pathologic variants associated with a cardiovascular disorder had a greater improvement in ejection fraction (EF), with 55% of the V− patients transitioning to HFrecEF, upon MSC treatment. This demonstrates that a particular previously unidentified subpopulation of NIDCM exhibits a preferential benefit from cell (e.g., MSC) therapy and, surprisingly, these patients lack pathologic genetic variants associated with the disorder.

The genetic data described herein provides evidence that VUS and PV+ patients had mild-to-absent responses and maintain as HFrEF, expressed by a higher mortality, LVAD requirements, transplant and MACE events compared to HFrecEF. Independent factors associated with blunted responses include long HF duration, greater EDV, NYHA classes III-IV, and lower systolic blood pressure. Thus, in various aspects, the disclosure provides a method of identifying subjects with reduced response to MSC therapy, which may prompt a clinician to select alternative treatment or a combination therapy that includes MSC therapy alongside other treatments. The method comprises identifying one or more pathologic variants in the gene panel set forth in FIG. 5 (e.g., ACTC, NYH7, MYH6, MYBPC3, TNNT2, TNNC1, TNNI3, TPM1, TTN, DMD, DES, LDB3, SGCD, PDLIM3, VCL, RYAB, ILK, LAMA4, FLNC, TCAP, CSRP3, ACTN2, MYPN, ANKRD1, BAG3, LMNA, TMPO, PSEN1, PSEN2, PLN, EYA4, TAZ/G4.5, CPT2, ACADVL, RBM20, ABCC, SCN5A, GATAD1, PRDM16, GAA, FKRP, CTNNA3, DSP, PKP2, SOS2, and/or ALMS1). In some embodiments, the method comprises identifying one or more pathologic variants in one or more of the following genes: ANKRD, BAG3, DMD, GATAD1, LDB3, LMNA, MYBPC3, MYH6, RBM20, TNNT2, TTN and RBM20. Optionally, the subject comprises a pathologic mutation in all of ANKRD, BAG3, DMD, GATAD1, LDB3, LMNA, MYBPC3, MYH6, RBM20, TNNT2, TTN and RBM20.

V− patients had a significantly increase in EF and survival was greatly increased, compared to PV+ patients. Interestingly, V− patients not only had a higher survival rate, but also had a significant decrease in MACE events after cell delivery after one year follow-up. Relevant genetic variants were identified in patients that had higher mortality and MACE events. This finding may refine the clarity of identification of patients who benefit from stem cell delivery and the meaningful impact in the treatment of cardiovascular disorders, such as NIDCM.

Identifying Genetic Variants

Analysis of genetic variants according to the method described herein in an individual's nucleic acid can be done by any method or technique capable of determining nucleotides present in a polymorphic site. Once a biological sample from a subject has been obtained (e.g., a bodily fluid, such as urine, saliva, plasma, serum, or a tissue sample, such as buccal tissue sample or buccal cell) detection of a sequence variation or allelic variant SNP is typically undertaken. In some embodiments, the method comprises determining the sequence of either genomic DNA or cDNA and comparing these sequences to the known alleles SNPs of the gene. Any of a variety of methods that exist for detecting sequence variations may be used in the methods of the invention.

Other commercially available methods exist for high throughput SNP identification not using direct sequencing technologies, for example, Illumina's Veracode Technology, Taqman® SNP Genotyping Chemistry and KASPar SNP genotyping Chemistry.

A variation on the direct sequence determination method is the Gene Chip™ method available from Affymetrix. Alternatively, robust and less expensive ways of detecting DNA sequence variation are also commercially available. For example, Perkin Elmer adapted its TAQman Assay™ to detect sequence variation. Orchid BioSciences has a method called SNP-IT™ (SNP-Identification Technology) that uses primer extension with labeled nucleotide analogs to determine which nucleotide occurs at the position immediately 3' of an oligonucleotide probe, the extended base is then identified using direct fluorescence, indirect colorimetric assay, mass spectrometry, or fluorescence polarization. Sequenom uses a hybridization capture technology plus MALDI-TOF (Matrix Assisted Laser Desorption/Ionization—Time-of-Flight mass spectrometry) to detect SNP genotypes with their MassARRAY™ system. Promega provides the READIT™ SNP/Genotyping System (U.S. Pat. No. 6,159,693). In this method, DNA or RNA probes are hybridized to target nucleic acid sequences. Probes that are complementary to the target sequence at each base are depolymerized with a proprietary mixture of enzymes, while probes which differ from the target at the interrogation position remain intact. The method uses pyrophosphorylation chemistry in combination with luciferase detection to provide a highly sensitive and adaptable SNP scoring system. Third Wave Technologies has the Invader OS™ method that uses a proprietary Cleavage enzymes, which recognize and cut only the specific structure formed during the Invader process. Invader OS relies on linear amplification of the signal generated by the Invader process, rather than on exponential amplification of the target. The Invader OS assay does not utilize PCR in any part of the assay. In addition, there are a number of forensic DNA testing labs and many research labs that use gene-specific PCR, followed by restriction endonuclease digestion and gel electrophoresis (or other size separation technology) to detect restriction fragment length polymorphisms (RFLPs).

In some embodiments, the presence of a pathologic gene variant is determined by next generation sequencing. (See, e.g., Srivatsan et al., PLoS Genet 4: e100139 (2008); Rasmussen et al., Nature 463:757-762 (2010); Li et al., Nature 463: 311-317 (2010); Pelak et al., PLoS Genet 6: e1001111 (2010); Ram et al., Syst Biol Reprod Med (57(3):117-118 (2011); McEllistrem, Future Microbiol 4: 857-865 (2009); Lo et al., Clin Chem 55: 607-608 (2009); Robinson, Genome Biol 11:144 (2010); and Araya et al., Trends Biotechnology doi10.1016.j.tibtech.2011.04.003 (2011)). For example, such techniques may involve the fragmentation of a genomic nucleic acid sample followed by parallel sequencing of those fragments and the alignment of the sequenced fragments to reconstruct the original sequence. Here, the genomic nucleic acid of interest is sheared into fragments and "adapters" (short nucleic acids of known sequence) are ligated to the fragments. Adaptor-modified fragments can be enriched via PCR. An adaptor-modified fragment (and amplified copies thereof, if present) may be flowed across a flow cell where the fragments are allowed to hybridize to primers immobilized on the surface of the cell. The fragments are then amplified by isothermal bridge amplification into a cluster consisting of thousands of molecules identical to the original. Sequencing primers can then be hybridized to the ends of one strand of the clusters, reversibly blocked, and labeled nucleotides added. The addition of each particular nucleotide can be identified by the label, then the label can be removed and the nucleotide un-blocked so that another blocked and labeled nucleotide can be added to identify the next position in the nucleic acid sequence. Once the desired number of rounds of addition, detection, and unblocking occur, the resulting sequences can be aligned.

Cell Therapy

The method described herein comprises administering a cell therapy to a subject identified as being a hyper-responder to the cell therapy. Contemplated cell therapies include, but are not limited to, mesenchymal stem cell therapy, cardiac stem cell therapy, induced pluripotent stem cell therapy, and embryonic stem cell therapy.

In some embodiments, the cell therapy comprises mesenchymal stem cell (MSC) therapy. MSCs are adult stem cells that are prototypically found in bone marrow and have the capacity to differentiate into multiple cell types. MSCs obtained from cord blood, adipose tissue, Whaton's Jelly or amniotic fluid are also contemplated.

MSCs stimulate the proliferation and differentiation of endogenous precursor cells and play a crucial role in maintaining stem cell niches[27]. In addition, MSCs secrete paracrine factors which participate in angiogenesis, cardiomyogenesis, neovascularization, stimulation of other endogenous stem cells, and regulation of the immune system[28,29]. While MSCs are known to stimulate cardiac precursor cells and cell cycle activity in the heart, their role in stimulating other endogenous precursor populations has heretofore been unknown. The data provided herein establish that MSCs stimulate endogenous EPC activation, increasing the number and quality of functional EPCs. These findings suggest that augmentation of EPCs may represent a novel mechanism of action by which MSCs exert favorable biological effects.

Over the last decade, there has been an emerging interest in the use of MSCs in CV disorders[30]. Clinical trials have demonstrated a major safety profile for MSC administration, and suggested efficacy in patients with HF[30-32]; however, underlying mechanism(s) of action continue to be vigorously debated. The instant finding that allogeneic MSC injections in patients with both ischemic and non-ischemic HF results in an improvement in endothelial function specifically by restoring EPC function, FMD, and reducing VEGF levels towards normal offers a major new insight into the mechanisms of action of MSCs. In the study population, increased serum VEGF correlated with diminished EPC-CFUs, consistent with the idea that VEGF plays a compensatory role, a finding also reported in patients with cerebral aneurysm[26]. The findings provided herein establish that allogeneic MSCs can be employed to stimulate EPC bioactivity, improve arterial physiologic vasodilatory responses, and decrease unfavorable cytokine mobilization in patients with CV disease and other disorders associated with endothelial dysfunction.

In some embodiments, the cells (e.g., mesenchymal stem cells, induced pluripotent stem cells, embryonic stem cells or cardiac stem cells) are administered to the subject identified as being hyper-responsive to cell therapy according to any suitable method, including those known in the art. In some embodiments, the cells (e.g., mesenchymal stem cells, induced pluripotent stem cells, embryonic stem cells or cardiac stem cells) are administered locally. In some embodiments, the cells (e.g., mesenchymal stem cells, induced pluripotent stem cells, embryonic stem cells or cardiac stem cells) are administered by transendocardial injection. In some embodiments, the cells are mesenchymal stem cells. In some embodiments, the cells are either allogeneic or autologous mesenchymal stem cells.

The cells (e.g., mesenchymal stem cells, induced pluripotent stem cells, embryonic stem cells or cardiac stem cells) are optionally administered in an amount ranging from about 20 million to about $10^9$ cells. In some embodiments, the cells (e.g., mesenchymal stem cells, induced pluripotent stem cells, embryonic stem cells or cardiac stem cells) are administered in an amount ranging from about 20 million to about 30 million cells, or about 20 millions to about 40 million cells, or about 20 million to about 50 million cells, or about 20 million to about 60 million cells, or about 20 million to about 70 million cells, or about 20 million to about 80 million cells, or about 20 million to about 90 million cells, or about 30 million to about 50 million cells, or about 30 million to about 70 million, or about 30 million to about 90 million cells, or about 50 million to about 100 million cells, or about 100 million to about 300 million cells, or about 200 million to about 400 million cells, or about 500 million to about 1 billion cells, or about 500 million to about 10 billion cells. In some embodiments, about 20 million, or about 25 million, or about 30 million, or about 35 million, or about 40 million, or about 45 million, or about 50 million, or about 55 million, or about 50 million, or about 55 million, or about 60 million, or about 65 million, or about 70 million, or about 75 million, or about 80 million, or about 85 million, or about 90 million, or about 95 million, or about 100 million, or about 200 million, or about 300 million, or about 400 million, or about 500 million, or about 600 million, or about 700 million, or about 800 million, or about 900 million, or about 1 billion, or about 2 billion, or about 3 billion, or about 4 billion, or about 5 billion, or about 6 billion, or about 7 billion, or about 8 billion, or about 9 billion, or about 10 billion cells are administered to the subject.

The disclosure also provides methods for preparing compositions, such as pharmaceutical compositions, including cells (e.g., mesenchymal stem cells, induced pluripotent stem cells, embryonic stem cells or cardiac stem cells) and/or at least for instance, for use in disclosed methods for treating a cardiovascular disorder, heart failure or other cardiac conditions. Exemplary cardiovascular disorders include, but are not limited to, heart failure, adriamycin-induced cardiomyopathy, idiopathic dilated cardiomyopathy, ischemic cardiomyopathy, myocarditis, ischemic heart disease, cardiomyopathy due to infiltrative myocardial disease, cardiomyopathy due to amyloidosis, cardiomyopathy due to sarcoidosis, cardiomyopathy due to hemochromatosis, peripartum cardiomyopathy, cardiomyopathy due to hypertension, cardiomyopathy due to infection with the human immunodeficiency virus, cardiomyopathy due to connective-tissue disease, cardiomyopathy due to scleroderma, cardiomyopathy due to systemic lupus erythematosus, cardiomyopathy due to Marfan's syndrome, cardiomyopathy due to polyarteritis nodosum, cardiomyopathy due to nonspecific connective-tissue disease, cardiomyopathy due to ankylosing spondylitis, cardiomyopathy due to rheumatoid arthritis, cardiomyopathy due to relapsing polychondritis, cardiomyopathy due to Wegener's granulomatosis, cardiomyopathy due to mixed connective-tissue disease, cardiomyopathy due to substance abuse, cardiomyopathy due to chronic alcohol abuse, cardiomyopathy due to cocaine abuse, cardiomyopathy due to doxorubicin therapy, restrictive cardiomyopathy, familial cardiomyopathy, cardiomyopathy due to valvular heart disease, cardiomyopathy due to endocrine dysfunction, cardiomyopathy due to thyroid disease, cardiomyopathy due to carcinoid, cardiomyopathy due to pheochromocytoma, cardiomyopathy due to acromegaly, cardiomyopathy due to neuromuscular disease, cardiomyopathy due to neoplastic heart disease, cardiomyopathy due to congenital heart disease, cardiomyopathy due to complication of coronary-artery bypass surgery, cardiomyopathy due to radiation, cardiomyopathy due to critical illness, cardiomyopathy due to endomyocardial fibroelastosis, cardiomyopathy due to thrombotic thrombocytopenic purpura, cardiomyopathy due to rheumatic carditis, cardiomyopathy due to leukotriene therapy, cardiomyopathy due to lithium therapy and cardiomyopathy due to prednisone therapy.

In some embodiments, the pharmaceutical composition comprises isolated cells (e.g., mesenchymal stem cells, induced pluripotent stem cells, embryonic stem cells or cardiac stem cells) and a pharmaceutically acceptable carrier.

In some embodiments, the pharmaceutical compositions described herein are delivered via injection. These routes for administration (delivery) include, but are not limited to, subcutaneous or parenteral including intravenous, intra-arterial (e.g. intracoronary), intramuscular, intraperitoneal, intramyocardial, transendocardial, trans-epicardial, intranasal administration as well as intrathecal, and infusion techniques. Accordingly, the pharmaceutical composition is preferably in a form that is suitable for injection. When administering the composition parenterally, it will generally be formulated in a unit dosage injectable form (solution, suspension, emulsion). The pharmaceutical formulations suitable for injection include sterile aqueous solutions or dispersions and sterile powders for reconstitution into sterile injectable solutions or dispersions. The carrier can be a solvent or dispersing medium containing, for example, water, ethanol, polyol (for example, glycerol, propylene glycol, liquid polyethylene glycol, and the like), suitable mixtures thereof, and vegetable oils.

Proper fluidity can be maintained, for example, by the use of a coating such as lecithin, by the maintenance of the required particle size in the case of dispersion, and by the use of surfactants. Non-aqueous vehicles such a cottonseed oil, sesame oil, olive oil, soybean oil, corn oil, sunflower oil, or peanut oil and esters, such as isopropyl myristate, may also be used as solvent systems for compound compositions. Additionally, various additives which enhance the stability, sterility, and isotonicity of the compositions, including antimicrobial preservatives, antioxidants, chelating agents, and buffers, can be added. Prevention of the action of microorganisms can be ensured by various antibacterial and antifungal agents, for example, parabens, chlorobutanol, phenol, sorbic acid, and the like. In many cases, it will be desirable to include isotonic agents, for example, sugars, sodium chloride, and the like. Prolonged absorption of the injectable pharmaceutical form can be brought about by the use of agents delaying absorption, for example, aluminum monostearate and gelatin. According to the present invention, however, any vehicle, diluent, or additive used would have to be compatible with the compounds. Sterile injectable solutions can be prepared by incorporating the compounds utilized in practicing the present invention in the required amount of the appropriate solvent with various amounts of the other ingredients, as desired.

The pharmaceutical compositions of the present disclosure, e.g., comprising an amount of mesenchymal stem cells, can be administered to the subject in an injectable formulation containing any compatible carrier, such as various vehicles, adjuvants, additives, and diluents.

While various embodiments of the present disclosure have been described above, it should be understood that they have been presented by way of example only, and not limitation. Numerous changes to the disclosed embodiments can be made in accordance with the disclosure herein without departing from the spirit or scope of the invention. Thus, the breadth and scope of the present disclosure should not be limited by any of the above described embodiments.

All documents mentioned herein are incorporated herein by reference. All publications and patent documents cited in this application are incorporated by reference for all purposes to the same extent as if each individual publication or patent document were so individually denoted. By their citation of various references in this document, applicants do not admit any particular reference is "prior art" to their invention. Embodiments of inventive compositions and methods are illustrated in the following examples.

EXAMPLES

Example 1—Identification of Patients that are Hyper-Responsive to Cell Therapy The data provided in the following Example demonstrates that patients with dilated cardiomyopathy also determined to lack one or more pathologic gene variants are hyper-responsive to mesenchymal stem cell therapy.

Methods

The prospectively designed Percutaneous Stem Cell Injection Delivery Effects On Neomyogenesis in Dilated Cardiomyopathy (POSEIDON-DCM; NCT01392625)(1), randomly tested 100 million MSCs cells of autologous versus allogeneic origin for patient outcomes. Patients consented to genetic testing for genetic variants associated with NIDCM. Cells were delivered by 10 transendocardial stem cells injection (TESI), into 10 left ventricle sites, distributed in a uniform pattern, using the Biosense Webster MyoStar NOGA Catheter System (Johnson & Johnson).

Cardiac function and anatomy were evaluated by cardiac CT or MRI, depending on implantable cardiac devices. Functional capacity was assessed by six-minute walk distance test (6MWT) and forced expiratory volume at one second (FEV1). Quality of life (QOL) assessment included Minnesota Living with Heart Failure Questionnaire (MLHFQ) total score and New York Heart Failure Association (NYHA) functional class. All subjects provided written informed consent. This study was approved by the institutional review board (IRB) of the University of Miami Miller School of Medicine.

Imaging parameters were measured at baseline and 12 months after MSC injection, including ejection fraction (EF) and end diastolic (EDV) and systolic (ESV) volume, sphericity index (SI), as measured by cardiac CT or MRI. Functional parameters such as MLHFQ score, 6MWT, and NYHA classification were also evaluated at 3 and 6 months after cell delivery. Endothelial function parameters as endothelial progenitor colony (EPC) formation and flow-mediated dilatation (FMD) were assessed at three months after cell delivery. Ten patients did not receive one-year imaging parameters and eight patients did not receive functional parameter assessment due to: Death (n=2, not related to treatment), heart transplant (n=3), automated implantable cardioverter-defibrillator placement (LVAD) (n=2) and withdrawal from the study (n=3). Data measurements were performed as described and collected using a central electronic data system (1).

Genetic Testing: POSEIDON-DCM patients (n=34) underwent genetic analysis and were classified into groups according to the ACMG guidelines, including positive for pathologic/likely pathologic variant (PV+; n=8), negative for any potentially-relevant variants (V−; n=6), or those identified as variants of uncertain significance (VUS; n=20). The analysis was based upon a comprehensive cardiomyopathy panel that included 105 genes, composed of a primary panel of 50 genes associated with inherited cardiomyopathies, 30 genes with preliminary evidence for association with cardiomyopathy, eight genes related to autosomal recessive syndromic pediatric cardiomyopathy genes and 17 genes associated to RASopathy, syndromes affected by mutations on genes of the Ras-MAPK pathway. The analysis included both gene sequencing and testing for deletions/duplications. (11, 12)

DNA Extraction

DNA Extraction from PAXgene DNA Blood Tubes: DNA was extracted from PAXgene Blood DNA tubes utilizing Qiagen's FlexiGene chemistry on the FlexStar+ Automated DNA Extraction System. Flexigene chemistry utilizes a precipitation-based method for isolating high molecular weight DNA. DNA quality was assessed via a 0•8% agarose gel. Sample quantity is measured via spectrophotometry on the NanoDrop™ ND-8000 spectrophotometer using 1 ul of sample volume and following standard protocols. Sample measurements are performed in triplicate with an acceptable A260/280 range of 1•7-2•0 and a standard deviation of 15 across the three measurements. Sample quantity is also measured via the Qubit dsDNA BR assay that utilizes fluorescent dyes that emit light only when bound to their target. The intensity of the emitted light is captured by a fluorometer and the unknown concentration is interpolated or extrapolated using a standard curve generated by measuring samples of known concentration. Sample concentration, total amounts, and A260/280 ratios are calculated and recorded within the Nautilus LIMS™.

DNA Extraction from PBMCs: DNA was extracted from Peripheral Blood Mononuclear Cells (PBMCs) utilizing the QIAamp DNA Mini Kit standard protocol. The QIAamp Mini Kit utilizes a silica-membrane-based DNA isolation method from cells. DNA quality was assessed via a 0•8% agarose gel. Sample quantity is measured via spectrophotometry on the NanoDrop™ ND-8000 spectrophotometer using 1 ul of sample volume and following standard protocols. Sample measurements are performed in triplicate with an acceptable A260/280 range of 1•7-2•0 and a standard deviation of 15 across the three measurements. Sample quantity is also measured via the Qubit dsDNA BR assay that utilizes fluorescent dyes that emit light only when bound to their target. The intensity of the emitted light is captured by a fluorometer and the unknown concentration is interpolated or extrapolated using a standard curve generated by measuring samples of known concentration. Sample concentration, total amounts, and A260/280 ratios are calculated and recorded within the Nautilus LIMS™.

Next Generation Sequencing and Bioinformatics: Genetic testing was performed at Invitae (San Francisco, CA) as previously described. (13) Briefly, genomic DNA obtained from blood samples was subjected to target enrichment using hybridization capture with a custom bait pool, and sequenced using Illumina sequencing chemistry. A validated bioinformatics pipeline incorporating community standard and custom algorithms was used to identify sequence changes and exonic deletions/duplications simultaneously. Clinically significant observations were confirmed by orthogonal technologies, except individually validated variants and variants previously confirmed in a first-degree relative. Depending on the variant type, confirmation technologies may include any of the following: Sanger sequencing, Pacific Biosciences SMRT sequencing, MLPA, MLPA-seq, Array CGH.

Statistical analysis: Data distribution was evaluated using Pearson normality test, for continuous measures. Continuous variables normally distributed were assessed by 2-way ANOVA and multiple comparisons were performed using the Bonferroni and Tukey corrections and presented as Mean±SE. Non-normally distributed variables were assessed by Mann-Whitney test and reported by median and interquartile range [IQR]. Within data normally distributed were analyzed by paired t-test, otherwise by Wilcoxon matched-pairs. Categorical variables were analyzed by the Pearson chi-squared and Fisher's exact test as corresponding. Kaplan-Meier curve was used in the evaluation of survival distribution for the composite terminal event of all-cause death, cardiac transplantation, or LVAD placement. Imputation was not performed for missing data. All statistics were tested using two-sided at alpha=0•05. Analyses were done using GraphPad Prism7 (GraphPad Software, Inc. La Jolla, CA).

Results

Patient characteristics: Thirty-four patients with NIDCM were randomized and treated with autologous versus allogeneic MSCs. The patient population was 70•6% male. The mean age at the time of cell delivery was 55•12±1•92 years and the duration of the disease prior to cell delivery was 4•68 (1•93, 9•23) years. Pathologic variants were identified in 8 subjects (23•5%), among whom 6 had a positive family history of heart failure and 2 had an identified DCM phenotype in the absence of a documented or reported family history of DCM. Baseline characteristics of the genetic subgroups negative for any pathologic variants (V−), variants of uncertain significance (VUS), and patients harboring known pathologic/likely-pathologic variants (PV+), are shown in Table 1 below.

TABLE 1

Baseline characteristics

| Baseline Characteristics | V− n = 6 | VUS n = 20 | PV+ n = 8 | Total n = 34 | P-Value |
|---|---|---|---|---|---|
| Age at cell delivery (years) | 57.83 ± 3.16 | 55.05 ± 2.79 | 53.25 ± 3.77 | 55.12 ± 1.9 | 0.76 |
| Years of Diagnosis | 2.1 (2.09, 3.14) | 5.88 (5.88, 10.97) | 6.2 (1.84, 10.69) | 4.68 (1.93-9.23) | 0.18 |
| Sex | | | | | 0.31 |
| Male | 3 (50%) | 16 (80%) | 5 (62.5%) | 24 (70.58%) | |
| Female | 3 (50%) | 4 (20%) | 3 (37.5%) | 10 (29.41%) | |
| Cell delivery | | | | | 0.7 |
| Allogeneic | 4 (66%) | 9 (45%) | 5 (62.5%) | 18 (52.94%) | |
| Autologous | 2 (33%) | 11 (55%) | 3 (37.5%) | 16 (47.05%) | |
| History of Hypertension | 2 (33.3) | 8 (40%) | 0 (0%) | 10 (29.41%) | 0.12 |
| History of Smoking | 3 (50%) | 10 (50%) | 4 (50%) | 17 (50%) | >0.9 |
| History of Hyperlipidemia | 1 (16.6) | 7 (35%) | 1 (12.5%) | 9 (26.47%) | 0.4 |
| History of Diabetes | 0 (0%) | 1 (5%) | 0 (0%) | 1 (2.94%) | 0.7 |
| History of TIA or CVA | 0 (0%) | 2 (2%) | 1 (12.5%) | 3 (8.82%) | 0.69 |
| Atrial Ventricular Arrhythmia | 1 (16.6%) | 3 (15%) | 2 (25%) | 6 (17.64%) | 0.82 |
| AICD | 4 (66.6%) | 17 (85%) | 8 (100%) | 29 (85.29%) | 0.22 |
| NYHA Class I - No Limitation | 2 (33.3%) | 7 (35%) | 1 (12.5%) | 10 (29.41%) | |
| Class II - Slight Limitation of Physical Activity | 3 (50%) | 8 (40%) | 6 (75%) | 17 (50%) | |
| Class III - Marked Limitation of Physical Activity | 1 (16.6%) | 5 (25%) | 1 (12.5) | 7 (20.58%) | |
| Class IV - Marked Limitation at rest | 0 (0%) | 0 (0%) | 0 (0%) | 0 (0%) | |
| Peak VO2 (mL/kg/min) Median | 16.37 ± 1.82 | 18.34 ± 1.26 | 14.41 ± 1.42 | 17.03 ± 0.89 | 0.19 |
| Six Minute Walk Test (meters) | 437.3 ± 20.94 | 430.4 ± 24.13 | 390.5 ± 18.05 | 422 ± 15.12 | 0.51 |
| Forced Expiratory Volume in one second (%) | 2.07 ± 0.18 | 2.69 ± 0.16 | 2.57 ± 0.25 | 2.55 ± 0.12 | 0.16 |
| MLHF | 44.5 ± 12.13 | 33.75 ± 4.99 | 49.13 ± 7.32 | 36 (17.75, 64) | 0.26 |
| LV Size and Function | | | | | |
| Ejection Fraction (%) | 31.21 (18.74, 31.95) | 24 (17.37, 33.9) | 28.39 (21.87, 38.33) | 26.53 (18.74, 32.6) | 0.84 |

TABLE 1-continued

Baseline characteristics

| Baseline Characteristics | V− n = 6 | VUS n = 20 | PV+ n = 8 | Total n = 34 | P-Value |
|---|---|---|---|---|---|
| Left Ventricular End Diastolic Volume (ml): | 262.9 (217.9, 285.4) | 345.9 (281.8, 462.2) | 246.4 (197.3, 396.6) | 296.7 (246.4-429.3) | 0.07 |
| Left Ventricular Systolic Volume (ml): | 190.3 (151.4, 222.6) | 267.2 (182.3, 358.4) | 178.3 (123.6, 306.2) | 233.7 (168.5-325.7) | 0.16 |
| End Diastolic Sphericity Index | 0.519 ± 0.041 | 0.544 ± 0.024 | 0.576 ± 0.053 | 0.55 ± 0.02 | 0.69 |
| End Systolic Sphericity Index | 0.381 ± 0.033 | 0.411 ± 0.029 | 0.414 ± 0.045 | 0.407 ± 0.021 | 0.13 |
| Long Axis Diameter (mm) | 97.9 ± 3.19 | 111.6 ± 3.80 | 102.4 ± 7.57 | 107.3 ± 3.062 | 0.20 |
| End Diastolic Diameter (mm) | 66.13 (59.49, 69.65) | 77.27 (65.68, 85.03) | 67.75 (58.65, 78.8) | 70.4 (63.75, 80.1) | 0.10 |
| End Systolic Diameter (mm) | 60.5 42.91, 61.34) | 69.05 (56.75, 76.93) | 61.8 (46.1, 69.3) | 63.5 (54.55, 73.95) | 0.09 |

Blood chemistries and biomarkers prior to cell delivery, including TNF-α, pro-BNP, blood urea, CRP, renal function, electrolytes, hemoglobin, red blood cells, platelets and cholesterol levels, were similar between the groups. Medications prior to cell delivery, including aldosterone blocker, angiotensin receptor blocker, beta-blocker and statins, were similar in all groups. Likewise, the presence of implantable cardioverter-defibrillators (ICD) were similar among the groups.

Sequencing summary and genetic basis: Variants were detected mainly in the structural myocardial coding genes, including sarcomere and z disk, and nuclear envelope. Ion channel and mitochondrial coding genes were not detected in this patient population. Multiple variants in 11 genes associated with dilated cardiomyopathy (DCM) was observed, including ANKRD, BAG3, DMD, GATAD1, LDB3, LMNA, MYBPC3, MYH6, RBM20, TNNT2, TTN. Eight positive pathological variants associated with DCM were identified, including 3 variants in TTN, 2 in LMNA, 2 in DSP and 1 in MYBPC3. In addition, 9 variants of uncertain significance, that were possibly significant for pathological associations, were identified in ANKRD, BAG3, MYH6, RBM20, TNNT2 and TTN (FIG. 1).

Among the 34 patients, a total of 105 genes were sequenced, 39 positive pathological variants or variants of uncertain significance were identified in 28 subjects according to the ACMG guidelines. There were 8 positive pathological variants in 3 genes among 8 patients (100%) and 31 variants of uncertain significance in 23 genes among 20 patients. In the entire cohort, 21 patients (61•8%) had a single positive pathological variants or variant of uncertain significance, 5 had two positive pathological variants (15%), and 2 had more than three (6%) positive pathological variants or variants of uncertain significance in the same subject.

The most commonly affected gene was TTN, with variants observed in 6 patients, among which 3 (50%) were PV+. Importantly, one unique variant of uncertain significance in TTN Intron 248 had not been reported previously in normal or DCM patients, while other TTN VUSs are reported in both DCM and normal patients. The TTN subpopulation, which affected mostly male patients, was associated with severely impaired cardiac function, EFs below 30%. TNNT2 was the second most frequent variant in our study, and was found in 4 patients. Importantly, one unique variant of uncertain significance in TNNT2 [p.Arg151Cys], co-expressed in two unrelated patients, which gives greater likelihood to its pathological relevance. LMNA was the third most frequent gene, with variants found in three male patients, none of whom had a 12 month follow-up because all underwent heart transplantation owing to progression of disease in the absence of a response to MSC therapy.

Patient outcomes: Of the total of 34 NIDCM patients, 55% of those who were V− improved to HFrecEF, 55% of the VUS patients remained in the non-HFrecEF group, and 62•5% of the PV+ patients had an adverse outcome, defined as no significant benefit or worsening of cardiovascular status, requirement of LVAD or heart transplant, or death.

Among the specific measures of these clinical outcomes, V− patients had a significant increase in EF at 12 months: median change +13•6% (IQR=7•8, 20•5; p=0•002). This compare to +6•5% (0•9, 11•1; p=0•005) in the VUS category, and a trend toward a decline in PV+ patients, with a median change of −5•9% (IQR=−12•7, +1•0; p=0•2; p=0•01 between groups) (FIG. 6A). Cardiac volumes, including EDV and ESV, showed no significant difference between the groups. ESV was similar between VUS −24 mL (−54•5, 14•1; p=0•04) and V−: −38•5 mL (−97•1, 0•8; p=0•31) compared to PV+: +27•9 mL (17•0, 40•9; p=0•25; p=0•26 between groups). Similarly, EDV in the V− was −42•8 mL (−81•7, 48•2; p=0•6) and VUS −10•3 mL (−38.6, 24•7; p=0•5) vs. +43•3 mL (−37•7, 45•7; p=0•5) in the PV+ group (p=0•74 between groups). Reverse cardiac remodeling was not different over time between groups.

Figure 2A:
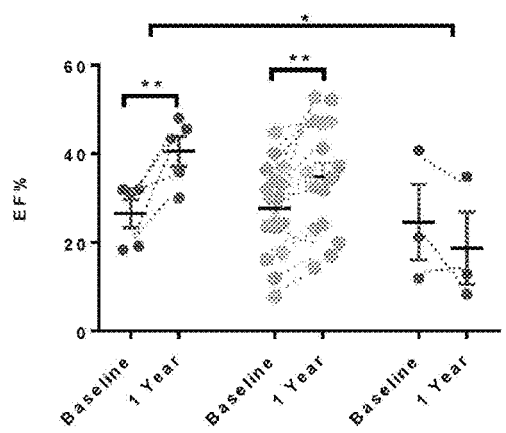
FIGS. 2A-2E.
Figure 2B:
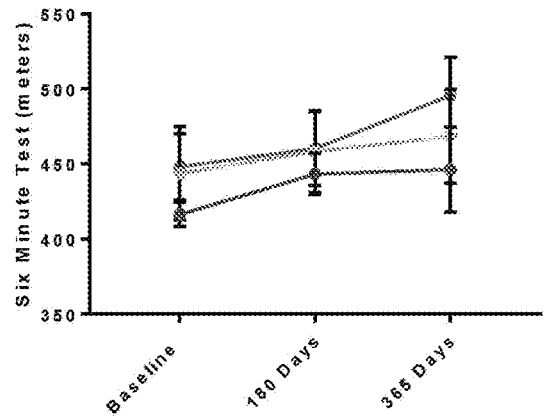
Figure 2C:
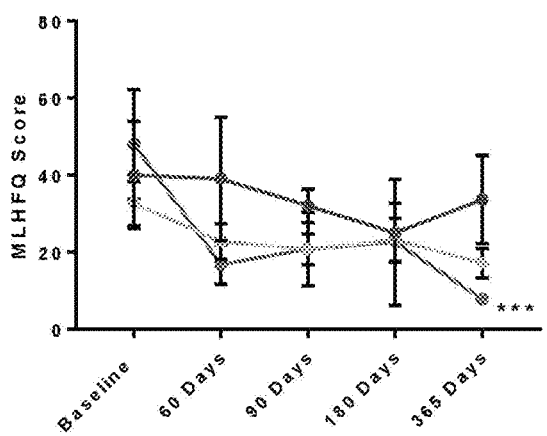
Figure 2D:
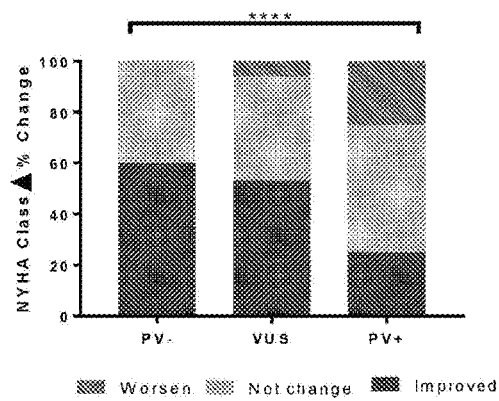
Figure 2E:
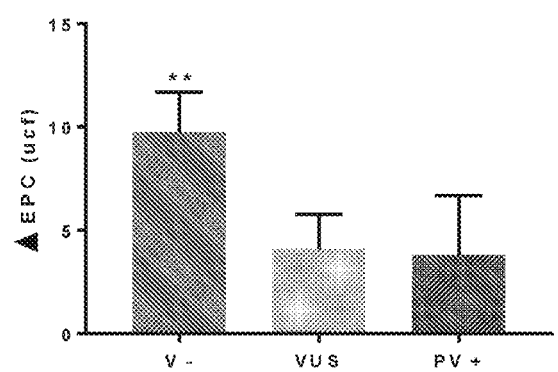

Functional capacity and QOL improved to a greater extent in the V− patients. Six-minute walk distance (6MWT), improved notably in V−: +33 m (30, 72•5; p=0•06), but not in VUS: 32•5 m (0, 53; p=0•24) and PV+: 39 m (−17, 68; p=0•5; p=0•9 between groups) (FIG. 2B). V− patients had the greatest improvement in MLHFQ by: −40•2±14 (p=0•0005) contrasted with VUS: −15•4±6•1 (p=0•07) and PV+: −6•3±11•6 (p=>0•9; p=0•3 between groups) (FIG. 2C). Interestingly, NYHA class improved by 60% in V− patients, compared to 53% in VUS patients and 25% in PV+ patients (between group delta % change p=<0•0001) (FIG. 2D). Endothelial function evaluated by EPC was increased by 9•7±1•9 ucf in V− (p=0•009) in contrast to VUS: 4•1±1•7 ucf (p=0•07) and PV+: 3•8±2•9 ucf (p=0•4) (FIG. 2E). Importantly, TNFα levels decreased significantly in all the groups from baseline to one year follow-up. V− patients decreased by −6·93±2·59 pg/mL (p=0·044), VUS by −8·68±1·47 pg/mL (<0·0001) and PV+ by −10·77±1·97 pg/mL (p=0·0016).

Figure 3A:
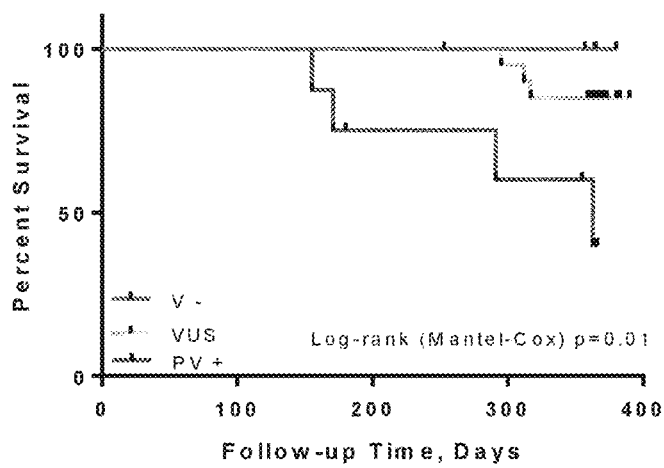
FIGS. 3A-3B. Genetic variation affect MACE and Survival in response to MSC delivery.
Figure 3B:
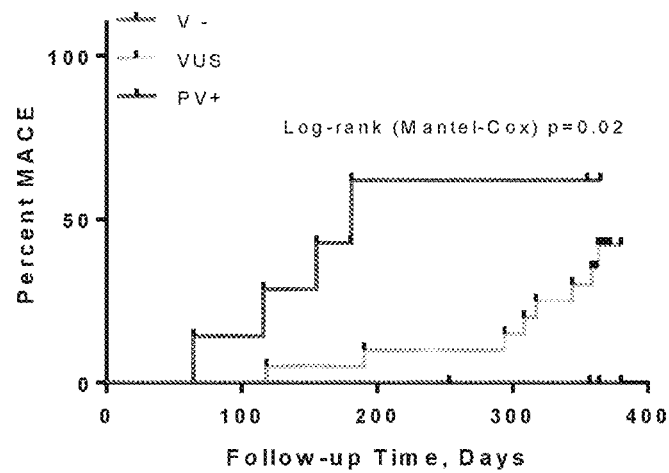

After a follow-up of up to one year, seven subjects had a terminal event, including death (n=2), transplant (n=3) or LVAD placement (n=2). Three patients withdrew from the study, one in each group. Patients negative for any variants had greater one-year survival (100%) compared with VUS (85%) and PV+ (40%) (Log-rank (Mantel-Cox) test, p=0·015) (FIG. 3A). Interestingly, all patients who received a transplant had a mutation in LMNA. PV+ patients had a substantial increase of risk for death, transplant or LVAD by one-year follow-up. Similarly, MACE events differed between V− patients, who did not have any events, compared to VUS with seven events (42·2%) and PV+ patients who had fourth events (61·9%; Log-rank (Mantel-Cox) test, p=0·021) (FIG. 3B).

Discussion

Despite multiple phase I and II clinical trials, there is a continuing variability in responses to intramyocardial injection of MSCs and controversy as to the ideal patient population for cell treatment. In this study, the genotypes of a NIDCM population were explored to test the association between genotype and effectiveness of MSC therapy. The results support the concept that these subpopulations are not discernible at baseline by phenotypic or demographic characteristics. However, the V− group demonstrated a significantly greater clinical benefit compared to VUS and PV+ groups, including improved cardiac function and functional capacity. Moreover, patients with pathologic or likely-pathologic variants in cardiomyopathy-associated genes had a decreased survival and increase in MACE events at one year. Overall, these findings strongly support for the idea that NIDCM genotype plays a major role in determining individual patient responsiveness to intramyocardial MSC delivery. Accordingly, these findings highlight the value of incorporating genetic testing to prospectively identify the potential for beneficial responses to cell delivery in patients with a similar disease phenotype.

Summary:

These findings provide compelling support for the concept that genotype in NIDCM plays a major role in determining patient responsiveness to MSC cell therapy, benefiting V− patients by improving cardiac function, MACE and survival. In contrast, pathological variants appear to adversely influence cardiac structure, function, and long-term outcome. It is also possible that genetic variants that express with a less severe phenotype (either because of a variant that is less pathologic or variable expression) will have different responses to cell therapy.

REFERENCES

1. Go et al., Circulation 2014; 129:e28-e292.
2. Blum A. The Israel Medical Association journal: IMAJ 2009; 11:105-11.
3. Marti et al., Journal of the American College of Cardiology 2012; 60:1455-69.
4. Santiago et al., Nature Reviews Cardiology 2009; 6:590-8.
5. Schulman et al., Journal of hypertension Supplement: official journal of the International Society of Hypertension 2006; 24:S45-50.
6. Polovina et al., Postgraduate medicine 2014; 126:38-53.
7. Zampetaki et al., Cardiovascular Research 2008; 78:413-21.
8. Rehman et al., Circulation 2003; 107:1164-9.
9. Schulman et al., Regen Med 2012; 7:17-24.
10. Karantalis et al., Am J Physiol Heart Circ Physiol 2012; 303:H256-70.
11. Williams et al., Circulation research 2011; 109:923-40.
12. Suncion et al., Stem Cells Translational Medicine 2012; 1:29-35.
13. Hatzistergos et al., Circulation research 2010; 107:913-22.
14. Chen et al., PloS one 2008; 3:e1886.
15. Werner et al., N Engl J Med 2005; 353:999-1007.
16. Shantsila et al., J Am Coll Cardiol 2007; 49:741-52.
17. Hill et al., New England Journal of Medicine 2003; 348:593-600.
18. Corretti et al., Journal of the American College of Cardiology 2002; 39:257-65.
19. Werner et al., Basic research in cardiology 2007; 102:565-71.
20. Shantsila et al., Journal of the American College of Cardiology 2007; 49:741-52.
21. Schmidt-Lucke et al., Circulation 2005; 111:2981-7.
22. Chin et al., The American Journal of Cardiology 2002; 90:1258-60.
23. Tsai et al., Clinical Science 2005; 109:39-43.
24. Seko et al., Clinical Science 2004; 106:4.
25. Eleuteri et al., European Journal of Cardiovascular Prevention & Rehabilitation 2011; 18:607-14.
26. Wei et al., Journal of neuroscience research 2011; 89:1822-8.
27. Williams et al., Circulation Research 2011; 109:923-40.
28. Gnecchi et al., Circulation Research 2008; 103:1204-19.
29. Caplan et al., Journal of Cellular Biochemistry 2006; 98:1076-84.
30. Telukuntla et al., Journal of the American Heart Association 2013; 2.
31. Hare et al., J Am Coll Cardiol 2009; 54:2277-86.
32. Hare et al., JAMA 2012; 308:2369-79.
33. Vasa et al., Circulation Research 2001; 89:e1-e7.
34. Franz Alber et al., Journal of the American College of Cardiology 2002; 39:1951-5.
35. Yu et al., Gerontology 2013; 59:557-63.
36. Bustos et al., American Journal of Respiratory and Critical Care Medicine 2014; 189:787-98.
37. Efimenko A, Dzhoyashvili N, Kalinina N, et al. Adipose-Derived Mesenchymal Stromal Cells From Aged Patients With Coronary Artery Disease Keep Mesenchymal Stromal Cell Properties but Exhibit Characteristics of Aging and Have Impaired Angiogenic Potential. Stem Cells Translational Medicine 2013.
38. Asumda et al., Stem cell research & therapy 2013; 4:47.
39. Chang et al., Circulation 2007; 116:2818-29.

What is claimed is:

1. A method of treating cardiomyopathy in a subject in need thereof comprising
administering to a subject identified as a hyper-responder to mesenchymal stem cell therapy an amount of mesenchymal stem cells effective to treat the cardiomyopathy in the subject, wherein the subject is identified as a hyper-responder by determining the absence of a pathologic variant relevant for cardiomyopathy in the following genes: ACTC, MYH7, MYH6, MYBPC3, TNNT2, TNNC1, TNNI3, TPM1, TTN, DMD, DES, LDB3, SGCD, PDLIM3, VCL, RYAB, ILK, LAMA4, FLNC, TCAP, CSRP3, ACTN2, MYPN, ANKRD1, BAG3, LMNA, TMPO, PSEN1, PSEN2, PLN, EYA4, TAZ/G4.5, CPT2, ACADVL, RBM20, ABCC, SCN5A, GATAD1, PRDM16, GAA, FKRP, CTNNA3, DSP, PKP2, SOS2, and ALMS1.

2. The method of claim 1, wherein the mesenchymal stem cell therapy is allogeneic.

3. The method of claim 1, wherein the mesenchymal stem cell therapy is autologous.

4. The method of claim 1, wherein the cardiomyopathy is adriamycin-induced cardiomyopathy, idiopathic dilated cardiomyopathy, ischemic cardiomyopathy, myocarditis, ischemic heart disease, cardiomyopathy due to infiltrative myocardial disease, cardiomyopathy due to amyloidosis, cardiomyopathy due to sarcoidosis, cardiomyopathy due to hemochromatosis, peripartum cardiomyopathy, cardiomyopathy due to hypertension, cardiomyopathy due to infection with the human immunodeficiency virus, cardiomyopathy due to connective-tissue disease, cardiomyopathy due to scleroderma, cardiomyopathy due to systemic lupus erythematosus, cardiomyopathy due to Marfan's syndrome, cardiomyopathy due to polyarteritis nodosum, cardiomyopathy due to nonspecific connective-tissue disease, cardiomyopathy due to ankylosing spondylitis, cardiomyopathy due to rheumatoid arthritis, cardiomyopathy due to relapsing polychondritis, cardiomyopathy due to Wegener's granulomatosis, cardiomyopathy due to mixed connective-tissue disease, cardiomyopathy due to substance abuse, cardiomyopathy due to chronic alcohol abuse, cardiomyopathy due to cocaine abuse, cardiomyopathy due to doxorubicin therapy, restrictive cardiomyopathy, familial cardiomyopathy, cardiomyopathy due to valvular heart disease, cardiomyopathy due to endocrine dysfunction, cardiomyopathy due to thyroid disease, cardiomyopathy due to carcinoid, cardiomyopathy due to pheochromocytoma, cardiomyopathy due to acromegaly, cardiomyopathy due to neuromuscular disease, cardiomyopathy due to neoplastic heart disease, cardiomyopathy due to congenital heart disease, cardiomyopathy due to complication of coronary-artery bypass surgery, cardiomyopathy due to radiation, cardiomyopathy due to critical illness, cardiomyopathy due to endomyocardial fibroelastosis, cardiomyopathy due to thrombotic thrombocytopenic purpura, cardiomyopathy due to rheumatic carditis, cardiomyopathy due to leukotriene therapy, cardiomyopathy due to lithium therapy or cardiomyopathy due to prednisone therapy.

5. The method of claim 1, wherein the cells are administered locally.

6. The method of claim 5, wherein the cells are administered by transendocardial injection.

7. The method of claim 1, wherein the cells are administered in an amount ranging from about 20 million to about $10^9$ cells.

8. The method of claim 6, wherein the cells are administered by one or more transendocardial injections into one or more sites on the ventricle of the subject.

9. The method of claim 6, wherein the cells are administered by ten transendocardial injections into ten sites on the left ventricle of the subject.

10. The method of claim 6, wherein the cells are administered by fifteen transendocardial injections into fifteen sites on the left ventricle of the subject.

11. The method of claim 6, wherein the cells are administered by twenty transendocardial injections into twenty sites on the left ventricle of the subject.

12. The method of claim 6, wherein the cells are administered in an amount of about 400 million cells.

13. The method of claim 1, wherein administration of the cells results in an increase in flow-mediated vasodilation (FMD) in the subject of at least 3%.

14. The method of claim 1, wherein the administration of the cells results in an increase of ejection fraction in the subject compared to the ejection fraction of the subject prior to treatment with the cells.

15. The method of claim 1, wherein the administration of the cells results in the subject having an increased six minute walk distance compared to the six-minute walk distance prior to treatment with the cells.

16. The method of claim 7, wherein the cells are administered by one or more transendocardial injections into one or more sites on the ventricle of the subject.

17. The method of claim 7, wherein the cells are administered in an amount of about 400 million cells.

* * * * *